United States Patent
Wang et al.

(10) Patent No.: US 11,870,256 B2
(45) Date of Patent: Jan. 9, 2024

(54) AI-BASED SOFTWARE SERVICE TO SHAVE ELECTRICITY CONSUMPTION PEAK

(71) Applicant: SPACE PTE. LTD., Singapore (SG)

(72) Inventors: Yi Wang, Singapore (SG); Elissa Yanting Lim, Singapore (SG); Rully Adrian Santosa, Singapore (SG); Soon Siang Tan, Singapore (SG); Yiqun Hu, Singapore (SG); Yanhui Chen, Singapore (SG)

(73) Assignee: SPACE PTE. LTD., Singapore (SG)

( * ) Notice: Subject to any disclaimer, the term of this patent is extended or adjusted under 35 U.S.C. 154(b) by 163 days.

(21) Appl. No.: 17/487,096

(22) Filed: Sep. 28, 2021

(65) Prior Publication Data
US 2022/0109298 A1    Apr. 7, 2022

(30) Foreign Application Priority Data
Oct. 1, 2020    (SG) .......................... 10202009796Y

(51) Int. Cl.
*H02J 3/00* (2006.01)
*H02J 3/24* (2006.01)
*H02J 3/28* (2006.01)

(52) U.S. Cl.
CPC .............. *H02J 3/003* (2020.01); *H02J 3/004* (2020.01); *H02J 3/24* (2013.01); *H02J 3/28* (2013.01)

(58) Field of Classification Search
CPC .... H02J 3/003; H02J 3/004; H02J 3/24; H02J 3/28; H02J 3/32; H02J 7/00712; Y04S 10/50
See application file for complete search history.

(56) References Cited

U.S. PATENT DOCUMENTS

| | | | |
|---|---|---|---|
| 2013/0030590 A1* | 1/2013 | Prosser | H02J 3/14 700/295 |
| 2016/0241042 A1* | 8/2016 | Mammoli | H02J 3/381 |
| 2017/0264135 A1* | 9/2017 | Hashimoto | H02J 7/0071 |
| 2018/0226800 A1* | 8/2018 | Bhattarai | H02J 3/28 |
| 2019/0042992 A1* | 2/2019 | Fife | G05B 13/048 |
| 2020/0033933 A1* | 1/2020 | Wang | G06F 17/16 |
| 2020/0076196 A1* | 3/2020 | Lee | H02J 3/008 |

FOREIGN PATENT DOCUMENTS

| KR | 102014201 B1 * | 8/2019 |
|---|---|---|
| KR | 102014201 B1 | 8/2019 |

OTHER PUBLICATIONS

European Search Report for Application No. 21200412.1 dated Mar. 25, 2022.

* cited by examiner

*Primary Examiner* — Mohammad Ali
*Assistant Examiner* — Dhruvkumar Patel
(74) *Attorney, Agent, or Firm* — Burns & Levinson LLP; Steven M. Mills

(57) ABSTRACT

This invention relates to a method for optimising usage 5 of electricity from the grid and energy storage comprising: forecasting a predetermined number of hours of load at a predetermined interval to determine a forecasted load profile; subtracting a peak load from the forecasted load profile by a maximum amount of electricity that can be charged into or discharged from the energy storage to determine a subtracted peak; smoothening peaks 10 within 30 minutes period that are more than the subtracted peak to obtain a final forecast result; and determining optimised battery setpoint actions based on the final forecast result and energy storage operating constraints.

16 Claims, 5 Drawing Sheets

AI-BASED SOFTWARE SERVICE TO SHAVE ELECTRICITY CONSUMPTION PEAK

FIELD OF THE INVENTION

This invention relates to a system and method of shaving electricity consumption peak. Specifically, this invention relates to a system and method of shaving electricity consumption peak using AI-based software service. More specifically, this invention relates to a system and method of shaving electricity consumption peak in order to optimise usage of electricity from the grid and energy storage.

PRIOR ART

For industrial consumers, especially those who signed a contracted capacity (CC) scheme with the electricity supplier, properly defining CC and adhering to signed CC is a challenging task. Once the contract is signed with the electricity supplier, in the event that the maximum load demand exceeds the signed CC, it will incur an uncontracted capacity (UCC) charge which is significantly higher than CC charge. For example, if customers underestimate the growth in electrical demand in the planning phase, the peak demand will very likely exceed the signed CC and incur UCC charge with the increase of electrical demand at some point. Another example could be due to ad-hoc electrical demand (e.g. more water pumps need to be turned on to pump out water from the dry docks in a shipyard due to sudden increase in ship repair demand) which results in peak demand exceeding CC and incurring UCC charge. The extra cost incurred by the UCC charge could be a big portion of the final electricity bill. With the increased awareness of energy efficiency and environmental sustainability, customers are more open and ready to adopt cost-effective measures to reduce energy costs nowadays. Among different popular energy conservation measures, battery energy storage system (BESS) is widely used to reduce the peak electrical consumption drawn from electrical grid by delivering electricity directly from battery to end user, which is normally called peak shaving.

The idea of utilizing BESS to achieve peak shaving is to store electricity by charging the battery when electricity price and total electrical demand is low, and to deliver electricity by discharging the battery when electricity price and total electrical demand is high. Although BESS can be operated manually, there is no shortage of software service in the market integrated with artificial intelligence, to automate the operation. For the operation of BESS to be fully automated, the software service needs to be able to forecast future electrical demand and optimize battery actions accordingly in order to achieve highest savings. However, the inaccuracy of forecasting results (especially the misalignment between actual and forecasted consumption peak), failure to consider battery life cost (each battery action, either charge or discharge, is associated with reduction in battery lifespan) in optimization, and shortage of mechanism to prevent BESS from creating new consumption peak (charge battery when the consumption is already very high) poses different challenges for the service to deliver satisfied performance. Each of these issues impacts the peak shaving performance if not properly dealt with in the service or even not integrated into the service at all. As a result, satisfied peak shaving performance is not always guaranteed.

Therefore, those skilled in the art are striving to provide an improved method of optimising usage of electricity from the grid and energy storage.

SUMMARY OF THE INVENTION

The above and other problems are solved and an advance in the art is made by a system and method in accordance with this invention. A first advantage of the system and method in accordance with this invention is that the system and method is a plug-and-play Software as a service (SaaS) which is fully automated and readily deployable to existing system with minimum disruption to customers. A second advantage of file system and method in accordance with this invention is that the system and method is able to optimise energy to be imported from the grid based on historical energy consumption over a period of time. Since there are significant peak/off-peak electricity price differences, the system and method is able to control drawing of energy from the grid in a more cost effective manner. Further, the system and method also consider the condition of the energy storage system to optimise charging and discharging of the energy storage system.

A first aspect of the disclosure describes a method for optimising usage of electricity from the grid and energy storage. The method comprising: forecasting a predetermined number of hours of load at a predetermined interval to determine a forecasted load profile; subtracting a peak load from the forecasted load profile by a maximum amount of electricity that can be charged into or discharged from the energy storage to determine a subtracted peak; smoothening peaks within 30 minutes period that are more than the subtracted peak to obtain a final forecast; and determining optimised battery setpoint actions based on the final smoothed forecast result and energy storage operating constraints.

In an embodiment of the first aspect of the disclosure, the step of determining optimised battery setpoint actions based on the forecast result and energy storage operating constraints comprises: applying the energy storage operating constraints; and minimising an objective function that can be expressed in the following expression:

$$\text{Objective} = \sum_{t \in T}(P_{grid,t} \times \mu_t + P_{bat,t} \times \lambda) + 2 \times P^{peak}_{grid,t \in T} \times ucc$$

where $t \in T$ refers to a set of time steps in optimization horizon, $P_{grid,t}$ refers to electricity drawn from power grid at time step t, kWh, $P_{bat,t}$ refers to electricity charged into/discharged from battery at time step t, kWh, $P^{peak}_{grid,t \in T}$ refers to peak electricity drawn from power grid during optimization horizon, kWh, $\mu_t$ refers to electricity price at time step t, Currency unit/kWh, $\lambda$ refers to battery lifespan coefficient, Currency unit/kWh.

In an embodiment of the first aspect of the disclosure, the objective function is minimised by optimising $P_{grid,t}$ and $P_{bat,t}$.

In an embodiment of the first aspect of the disclosure, the step of applying the energy storage operating constraints comprises: determine time period and amount the energy storage needs to be charged or discharged based on the energy storage operating constraints wherein the energy storage operating constraints include upper and lower bound of battery capacity and upper and lower bound of charge and discharge amount within every 30 minutes.

In an embodiment of the first aspect of the disclosure, the setpoint actions comprises an amount of energy to be charged or discharged by the energy storage in the next 48 time slots of 30 minutes.

In an embodiment of the first aspect of the disclosure, the method further comprises controlling the energy storage to charge or discharge a specified amount of energy in a 30-minute time window based on the setpoint actions.

In an embodiment of the first aspect of the disclosure, the step of controlling the energy storage to charge or discharge the specified amount of energy in a 30-minute time slot based on the setpoint actions comprises: summing of an estimated consumption for the 30-minute window and the specified amount of energy to charge for the 30-minute window; and in response to the summation exceeding a current month observed peak consumption, stopping the energy storage from continuing to charge.

In an embodiment of the first aspect of the disclosure, the step of forecasting a predetermined number of hours of load at the predetermined interval to determine the forecasted load profile comprises applying a multilinear regression model to run in sequence at 30-min interval to generate a 30-min load forecasting for the next 24 hours.

In an embodiment of the first aspect of the disclosure, every run of the multilinear regression model will include a raw 30-min consumption data over past 8 days and the 30-min load forecasting for the next 24 hours.

A second aspect of the disclosure describes a system for optimising usage of electricity from the grid and energy storage. The system comprises: a load forecast module configured to forecast a predetermined number of hours of load at a predetermined interval to determine a forecasted load profile; a load forecast smoothing module configured to: subtract a peak load from the forecasted load profile by a maximum amount of electricity that can be charged into or discharged from the energy storage to determine a subtracted peak; smoothen peaks within 30 minutes period that are more than the subtracted peak to obtain a final forecast result; and a battery optimisation module configured to determine optimised battery setpoint actions based on the final forecast result and energy storage operating constraints.

In an embodiment of the second aspect of the disclosure, the battery optimisation module is further configured to: apply the energy storage operating constraints; and minimise an objective function that can be expressed in the following expression:

$$\text{Objective} = \sum_{t \in T} (P_{grid,t} \times \mu_t + P_{bat,t} \times \lambda) + 2 \times P_{grid,t \in T}^{peak} \times ucc$$

where $t \in T$ refers to a set of time steps in optimization horizon, $P_{grid,t}$ refers to electricity drawn from power grid at time step t, kWh, $f_{bat,t}$ refers to electricity charged into/discharged from battery at time step t, kWh. $P_{grid,t \in T}^{peak}$ refers to peak electricity drawn from power grid during optimization horizon, kWh, $\mu_t$ refers to electricity price at time step t, Currency unit/kWh, $\lambda$ refers to battery lifespan coefficient. Currency unit/kWh:

In an embodiment of the second aspect of the disclosure, the battery optimisation module is configured to minimise the objective function by optimising $P_{grid,t}$ and $P_{bat,t}$.

In an embodiment of the second aspect of the disclosure, the battery optimisation module is further configured to: determine time period and amount the energy storage needs to be charged or discharged based on the energy storage operating constraints wherein the energy storage operating constraints include upper and lower bound of battery capacity and upper and lower bound of charge and discharge amount within every 30 minutes.

In an embodiment of the second aspect of the disclosure, the setpoint actions comprises an amount of energy to be charged or discharged by the energy storage in the next 45 time slots of 30 minutes.

In an embodiment of the second aspect of the disclosure, the system further comprises; a scheduler configured to control the energy storage to charge or discharge a specified amount of energy in a 30-minute time window based on the setpoint actions.

In an embodiment of the second aspect of the disclosure, the scheduler is further configured to: sum up an estimated consumption for the 30-minute window and the specified amount of energy to charge for the 30-minute window, and in response to the sum exceeding a current month observed peak consumption, stop the energy storage from continuing to charge.

In an embodiment of the second aspect of the disclosure, the load forecast module is configured to: apply a multilinear regression model to run in sequence at 30-min interval to generate a 30-min load forecasting for the next 24 hours.

In an embodiment of the second aspect of the disclosure, every run of the multilinear regression model will include a raw 30-min consumption data over past 8 days and the 30-min load forecasting for the next 24 hours.

BRIEF DESCRIPTION OF THE DRAWINGS

The above and other features and advantages in accordance with this invention are described in the following detailed description and are shown in the following drawings.

DETAILED DESCRIPTION

This invention relates to a system and method of shaving electricity consumption peak. Specifically, this invention relates to a system and method of shaving electricity consumption peak using AI-based software service. More specifically, this invention relates to a system and method of shaving electricity consumption peak in order to optimise usage of electricity from the grid and energy storage.

Figure 1:
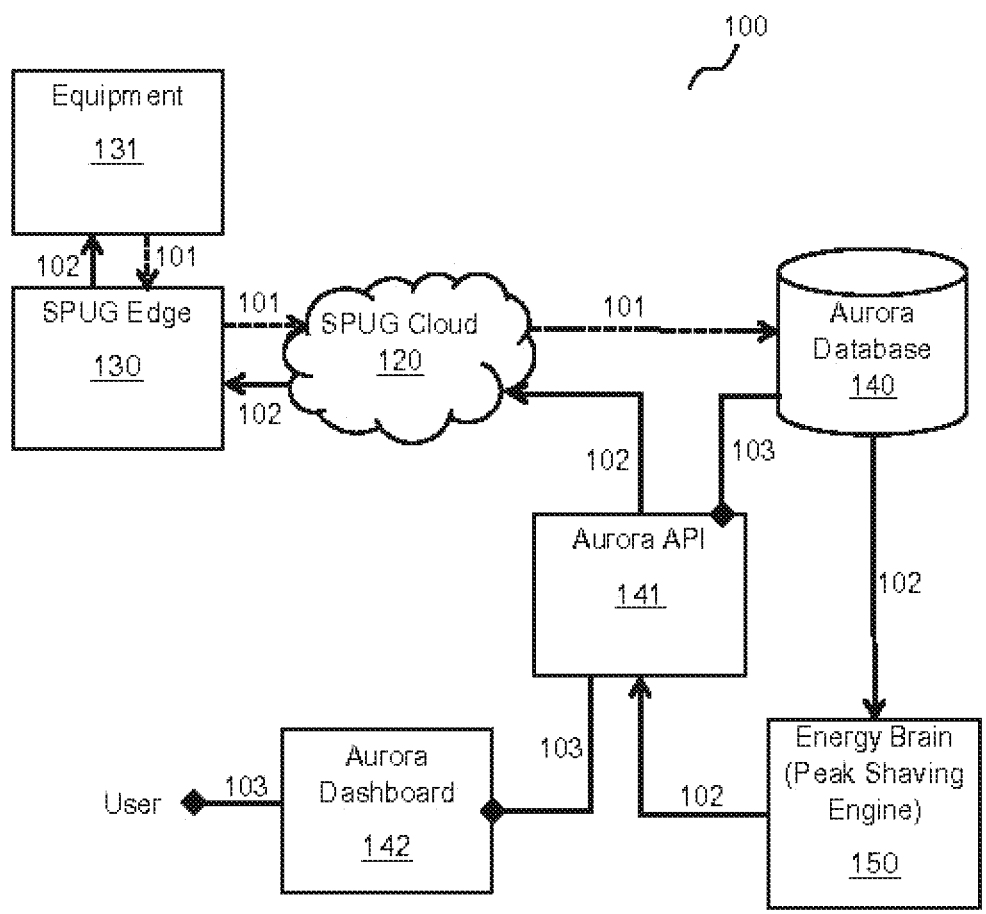
FIG. 1 illustrating an overall architecture of peak shaving service that will be executed on in accordance with an embodiment of this invention.

FIG. 1 outlines the overall architecture 100 of the invention which can be broken down into three main paths, namely Data Ingestion Path 101, Peak Shaving Engine path 102 (also known as Energy Brain Path) and Visualization Path 103. The Data Ingestion Path 101 begins with time-series data collection of all onsite equipment 131 via SPUG Edge 130. The collected time-series data are then stored in the Aurora Database 140 via SPUG Cloud 120. The Energy Brain Path 102 begins with querying overall consumption data from the Aurora Database 140 which are then consumed by the Peak Shaving Engine to output a sequence of optimized battery actions. The Aurora API 141 receives the output from the Peak Shaving Engine 150 and pushes the battery action instruction to SPUG Edge 130 via SPUG Cloud 120. The SPUG Edge 130 then executes the instruction to control the onsite battery 131 accordingly. The Visualization Path 103 begins with querying data from the Aurora Database 140 via the Aurora API 140 to display data to users.

Aurora database 140 is an energy management system that runs in the cloud with the following main capabilities:

1. Collect data from various devices (e.g. inverters, meters, sensors, weather stations, etc.) on the field via the SPUG Cloud 120 and store them in the cloud database. These metrics can be of various types (e.g. energy, active power, temperature, irradiance, etc.).

2. Present the collected data via the Aurora Dashboard 142 in a meaningful way to fie end users to provide insights into their energy consumption, general on, efficiency, and soon.

3. Analyse the collected data using Energy Brain 150 to get recommendations on how to achieve certain targets. For purposes of this discussion, the analysis is directed to reducing peak energy consumption from the grid.

4. Use the recommendations from Energy Brain 150 to control the devices on the field.

To collect data from and to control the target devices on the field, the Aurora database makes use of SPUG comprising SPUG Cloud 120 and SPUG Edge 130. SPUG Edges 130 are deployed on the field near to the target devices 131. In one embodiment, they are connected to the target devices 131 through Ethernet or serial connection. In another embodiment, they are connected to SPUG Cloud 120 through 3G connection. Apps are deployed on SPUG Edge 130 to handle the communication with the target devices 131 and with Aurora database 140, and to run different types of purpose-built algorithms written in Golang programming language. These apps are called the SPUG apps. One skilled in fie art will recognise that the programming language is a design choice and the actual programming language to be implemented is left to those skilled in the art.

A Peak Shaving SPUG app is provided and described in detail below that runs the algorithm for controlling the battery based on the recommendations from Aurora database 140, with local safeguard rules in place, for the purpose of shaving the energy consumption peak.

Figure 2:
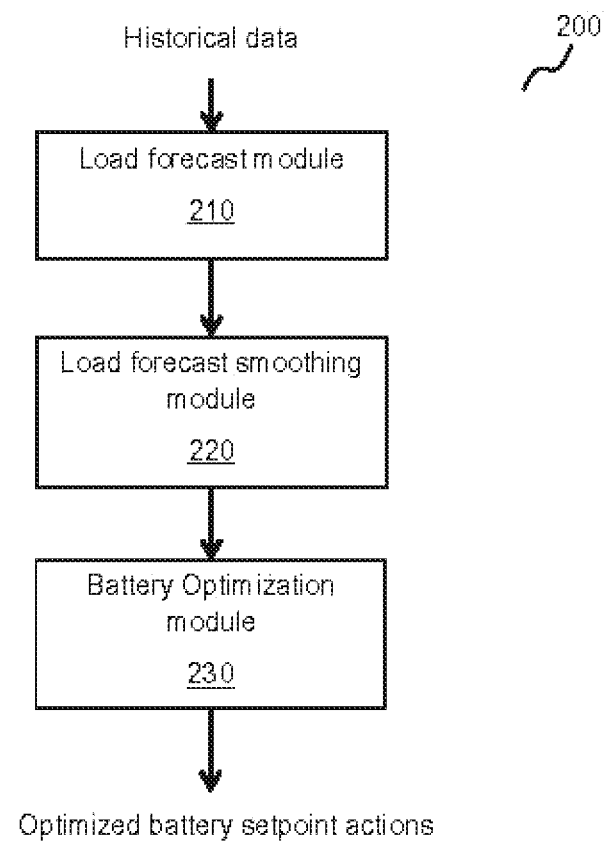
FIG. 2 illustrating modules in a peak shaving engine (Energy Brain) in accordance with an embodiment of this invention.

FIG. 2 shows the mechanism 200 inside Peak Shaving Engine 150. The Peak Shaving Engine 150 is called two minutes before every new 30-minute window. This 30-minute window is predetermined by the authority or by market players. In short, the Peak Shaving Engine 150 takes in historical consumption data and gives out optimized battery setpoint actions which minimize the potential overall cost for the next 24 hours consumption. The Peak Shaving Engine 150 comprises three strongly dependent modules, namely Load Forecast 210, Load Forecast Smoothing 220 and Battery Optimization 230. Outputs from the Load Forecast module 210 are inputs to the Load Forecast Smoothing module 220, and outputs from the Load Forecast Smoothing module 220 are inputs to the Battery Optimization module 230.

The Load Forecast module 210 forecasts a predetermined number of hours of load at a predetermined interval to determine a forecasted load profile. Specifically, the Load Forecast module 210 forecasts 30-min consumption intervals for the next 24 hours in absolute values. It requires continuous days of 30-minute historical consumption data and a set of engineered features to train a forecast model. The Load Forecast Smoothing module 220 then smooths the absolute value in the forecasted load profile to compensate for the possible unforeseen circumstances in the future. Finally, the Battery Optimization module 230 optimizes the overall cost function by determining optimised battery setpoint actions based on the Load Forecast Smoothing module 220 outputs and the battery operating constraints. In the next section, each module's components are elaborated in detail.

In order to make Energy Brain integratable with various customers, all modules are encapsulated into a single gRPC (Remote Procedure Calls) service, to which users can actively submit their optimization requests. gRPC is chosen because of its efficiency in performance and scalability. Energy Brain itself is stateless, which means that we can easily scale up and down according to the actual workload without worrying about having any side effects. A modern approach to manage Energy Brain is to package the gRPC service as a docker container image, and deploy as a horizontally scalable Deployment in Kubernetes. The stateless nature of Energy Brain makes it easy to handle both the packaging and deployment process using CI/CD tools like Jenkins.

Load forecasting is required for battery management via optimization strategy. The Load Forecast module 210 in accordance with this invention contains a multilinear regression model trained in Python language using LinearRegression module from scikit-learn machine learning library. One skilled in the art will recognise that other programming language may be used without departing from the invention. The multilinear regression model has a total of 124 inputs which are generated from the raw 30-min electricity consumption data over past 8 days via feature engineering. The input features include, but not limited to, lag features, date and time features, difference between different lag features and some interaction features. The output of the model is the forecasted electricity consumption for the next 30 min in the future. The forecast horizon can range from minutes to days or even months. In order to properly manage batteries to ensure they get charged/discharged in an optimum manner via optimization, it is important to ensure that the forecasting and optimization horizon captures the likely peak consumption in the future. Given that for most industrial customers, their daily load profiles have repetitive patterns, forecasting horizon of 24 hours is used. This means that one skilled in the art may vary the forecasting to other period other than 24 hours as that as there is a repetitive pattern. Hence, when the invention triggers the forecaster to run, the multilinear regression model within fie forecaster will run repetitively for 48 times in sequence (result from the previous run becomes the last 30-min data of the input to the following run) to generate 30-min load forecasting for the next 24 hours. As a result every run of the forecaster will input raw 30-min consumption data over past 8 days and output forecasted 30-min consumption data for the next 24 hours. The forecasting model is retrained on a monthly basis such as at the end of each month. Alternatively, the forecasting model is retrained as and when manually triggered. Each retraining requires past 185 days of raw consumption data as training data. One skilled in the art will recognise that the retraining can be conducted with other number of days of raw consumption data as training data without departing from the invention. However, the inventors of this invention has tried various number of days and 185 days turned out to give the best performance. That said, the actual number of days of raw consumption data that can be implemented to initiate retraining may vary from project to project and this is left as a design choice for the person skilled in the art.

Figure 3:
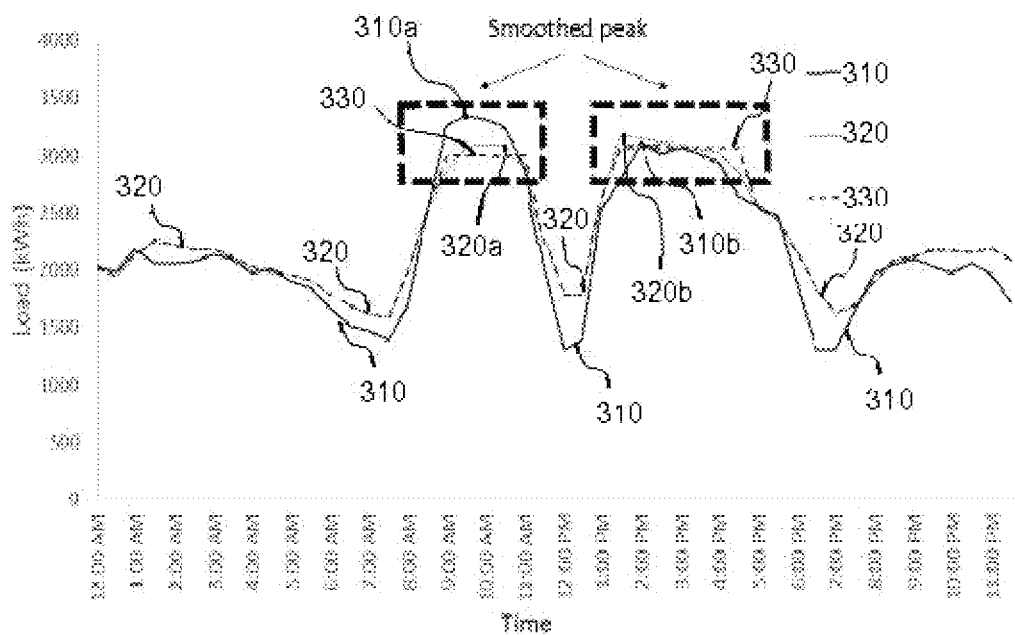
FIG. 3 illustrating a result from the modules in the Energy Brain in accordance with an embodiment of this invention.

FIG. 3 depicts a comparison between actual load 310, forecasted load 320 and forecasted load with smoothing 330 over a period of time from 12:00 am to 11:30 pm. Although the general patterns are quite similar to each other for actual load 310 and forecasted load 320 before smoothing, the peak timings are different in both morning and afternoon. The actual peak 310a timing precedes the forecasted peak 320a timing in the morning, while the actual peak timing 310b lags behind the forecasted peak 320b liming. From model accuracy perspective, the discrepancy between actual and forecasted peak timing is always neglected as long as the model evaluation results are satisfactory based on commonly used metrics such as root mean square error (RMSE) and mean percentage error (MPE). However, the negligence of such discrepancy can significantly impact the battery management when it comes to optimization. For example, if the forecasting results before smoothing are directly used to optimize the battery management in order to shave the peak for this 24 hours, the optimum solution will be to discharge the battery more when there is a forecasted peak. However, if this solution is deployed in production, as a result of peak timing discrepancy, the battery will not be discharged to optimum extent at actual consumption peak. Instead, it will be discharged more than expected when it's not at actual peak but at forecasted peak.

In order to solve the peak timing discrepancy issue which is unavoidable in load forecasting, smoothing technique is utilized in this invention to flatten out the consumption profile around the forecasted peak so that the flattened period will cover the actual peak and subsequently the optimization will suggest optimum battery action at actual peak. To flatten out the profile, the maximum amount of the electricity that can be charged into or discharged from the battery (which is also a battery operation constraint specific to different types of batteries and to be used in the optimization) within 30 mins is subtracted from the forecasted daily peak, i.e. subtracted peak=forecasted daily peak–battery operation constraint. For load higher than the subtracted peak, they are aggregated and then evenly distributed across respective periods to ensure that the consumption profile is smoothed out. For example, assume 9:00 am, 9:30 am, 10:00 am and 10:30 am loads are 100 kWh, 150 kWh, 170 kWh, and 110 kWh respectively. Assuming the constraint (max battery discharge) is 30 kWh, subtracting 30 kWh from 170 kWh (morning peak) gives 140 kWh (subtracted peak). With 150 kWh and 170 kWh higher than 140 kWh (subtracted peak), they are averaged as (150+170)/2=160. Hence, after applying smoothing, 9:00 am, 9:30 am, 10:00 am and 10:30 am loads would now be 100 kWh, 160 kWh, 160 kWh and 110 kWh respectively. The smoothing is handled separately for morning and afternoon. As shown in FIG. 3, the forecasted load 320 profile after smoothing has two smoothed periods (morning and afternoon) and they both cover the respective actual peak. With the utilization of smoothing technique, this invention successfully mitigates the adverse impacts resulting from the discrepancy between actual and forecasted peak and also allows for a more robust control over batteries even when the forecasting results are unreliable. Referring back to FIG. 3, there are two obvious peaks occurring in the morning and afternoon. Hence, the smoothing may be applied in the morning and the afternoon. One skilled in the art will recognise that peak shaving may vary from project to project depending on the forecasted load profile and the actual implementation is left to those skilled in the art.

The optimization problem in this invention is framed as a mixed-integer programming problem which allows the decision variables (battery status) to be constrained as integer values to represent different battery modes (charge, discharge, idle). CVXPY, a python package for convex optimization problems, is utilized in this invention to frame the economic dispatch optimization problem. In short, the battery optimization module 230 receives the next 24 hour forecasted loads from the load forecast smoothing module 220, applies the battery operating constraints and then minimizes the objective function in order to output recommended battery setpoint actions for the next 24 hours. The objective is to find the minimized value of the objective function while fulfilling all battery operating constraints. By first applying the battery operating constraints, it would be more efficient to minimize the objective function within the values that fulfil the battery operating constraints. Hence, it is preferred to first apply the battery operating constraints and thereafter minimized the objective function.

The objective function is expressed in the following expression:

$$\text{Objective} = \sum_{t \in T} (P_{grid,t} \times \mu_t + P_{bat,t} \times \lambda) + 2 \times P_{grid,t \in T}^{peak} \times ucc$$

where
t∈T: set of time steps in optimization horizon (24 hr)
$P_{grid,t}$: electricity drawn from power grid at time step t, kWh
$P_{bat,t}$: electricity charged into/discharged from battery at time step t, kWh
$P_{grid,t \in T}^{peak}$: peak electricity drawn from power grid during optimization horizon, kWh
$\mu_t$: electricity price at time step t, SGD/kWh
λ: battery lifespan coefficient (calculated by dividing battery investment cost by the maximum cumulative charge/discharge amount during lifespan), SGD/kWh
ucc: uncontracted capacity cost, SGD/kW The objective function is minimized by optimising $P_{grid,t}$ and $P_{bat,t}$.

The objective function, normally in peak shaving use cases, is the total incurred costs consisting of electricity usage cost and UCC cost. In this invention, the objective function not only considers the above costs, but also includes the battery life cost associated with battery operation. Battery is not a light investment and usually has a limited life cycle. Every charge/discharge is associated with a reduction in lifespan. Combining electricity usage cost, UCC cost and battery life cost in a single objective function allows fie optimizer to suggest most economical and sustainable actions (battery to stay in idle mode when necessary) by maximizing the reduction in UCC and, in the meanwhile, minimizing the battery operating wastage.

The battery operating constraints include upper/lower bound of battery capacity and upper/lower bound of charge/discharge amount within every 30 min. Hence, the optimizer is able to determine the time and amount to charge or discharge while operating within the battery operating constraints.

When there are multiple peaks in the forecasted profile for the next 24 hours (e.g. morning and after peak), the optimizer is robust enough to decide when and how much the battery needs to be discharged to achieve the best overall performance. When the difference between morning and afternoon peak is larger than the upper bound of battery charge/discharge amount within every 30 min, no discharge action during lower peak period is needed and hence the optimizer will suggest the battery to stay in idle mode during this period. On the contrary, when the difference is smaller than the upper bound, discharge actions are needed during both peak periods and hence the optimizer will suggest the battery to discharge accordingly during both periods.

Below is a list of different data sources and flow frequency from the Aurora to the Peak Shaving SPUG app:

1) 48 battery setpoint actions calculated by the Energy Brain 150. These setpoint actions specify the amount of energy to be charged or discharged by the battery in the next 48 time slots of 30 minutes. They are sent from Aurora to the SPUG app every 30 minutes. It should be noted that every run of the Energy Brain 150 will generate 48 setpoints for the next 24 hrs, but only the first one will be executed for the next 30-minute window. The Energy Brain 150 will re-run every 30 minutes faming a 30 minutes sliding window.

2) 5 historical load data points. These data points specify the amount of energy consumed in the past 5 time slots of 5 minutes. Essentially, it is the electricity drawn from grid over the first 25 minutes at 5 minutes interval in each 30 minutes window. They are sent from Aurora to the SPUG app every 5 minutes.

3) Current energy consumption peak of the month. This data point specifies the highest amount of energy consumption in a 30-minute time slot in the current month. It is sent from Aurora to the SPUG app every 5 minutes. While the monthly peak to be compared with will likely be the same over a single 30-minute window, doing this is to align with the 5-minute frequency in item 2, which is to compare current monthly peak wifi extrapolated 30-minute grid electricity consumption so that safe guard can be triggered in a timely manner if necessary.

Upon receiving each of these data, the Peak Shaving SPUG app stores the data to tie app internal database.

A scheduler would be running inside the Peak Shaving SPUG app. At the beginning of each 30-minute time slot, the scheduler runs the following actions;

1) Get the setpoint action for the current 30-minute time slot from the Peak Shaving SPUG app internal database.

2) Pass the setpoint action to the Operation Service running inside the Peak Shaving SPUG app and let the Operation Service controls the battery within the current 30-min time slot to charge or discharge the amount of energy specified by the setpoint action.

Within the Operation Service, there is a sequence of four condition checks done at every ten seconds. These checks give confidence in continuing the Scheduler's instruction as they ensure that the real-time battery status and consumption are taken into consideration. At any 10-second, if any one of the conditions is met, the battery control logic will intervene and stop the battery from continuing to charge/discharge for the remaining time of the 30-minute window. The details of the battery control logic inside Operation Service is elaborated in FIG. 5 below.

Figure 4:
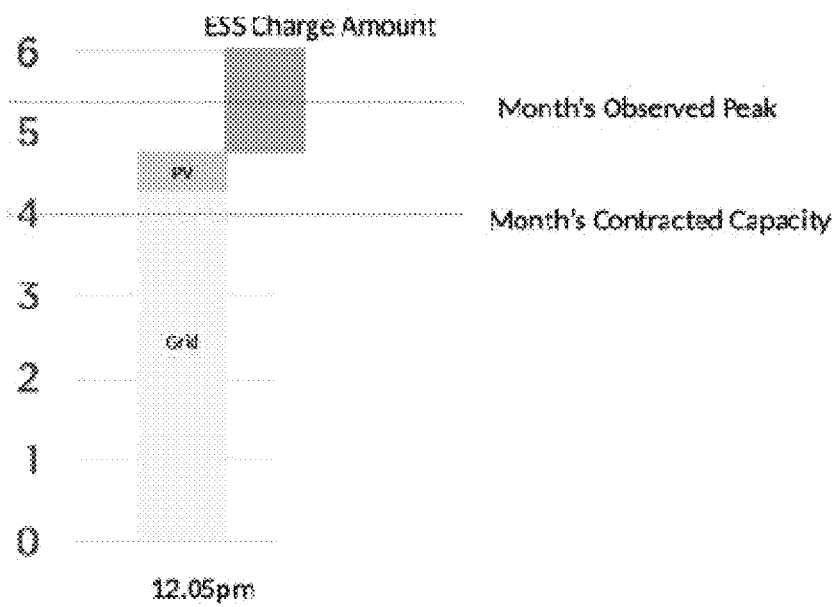
FIG. 4 illustrating a Battery Safeguard Rule in accordance with an embodiment of this invention.

FIG. 4 outlines one of the four condition checks called the Battery Safeguard Rule. The motivation of the rule is to eliminate or minimize additional cost which can potentially arise from a battery charge instruction. The Safeguard Rule is defined as the summation of:

1) the estimated consumption for the 30-minute window; and 2) the specified amount of energy to charge for the 30-minute window by the Scheduler.

If the summation exceeds the current month's observed peak consumption, the battery control logic will intervene and stop the battery from continuing to charge.

The Safeguard Rule itself can abruptly stop the battery from charging at any 5-min within a 30-minute window. When the battery action is stopped, the battery will stay in idle mode for the remaining time of the 30-minute window. For example, a customer has a monthly contracted capacity of 4 MW and a current month's observed peak consumption of 5.4 MW. Assuming for a given day, all four condition checks are not met from 12:00 PM to 12:04:50 PM. At 12:05 PM, the battery control logic inside Operation Service is triggered to check for the four conditions again. Assuming that the first three conditions are not met, the Battery Safeguard Rule check is then triggered. At this point, the estimated consumption for the 30-minute window is 4.8 MW. This is calculated by extrapolating the past five minute's consumption of 0.8 MW. The instructed energy to charge for the 30-minute window is simply the setpoint of 1.2 MW received from the Scheduler. The summation of the two components equates to 6 MW which exceeds the current month's observed peak consumption of 5.4 MW. The battery will then stop charging at 12:05 PM since it is estimated that at a constant rate of consumption for the next 25 minutes, the overall consumption for the 30-minute window will create a new peak of 6 MW which is undesirable.

Figure 5:
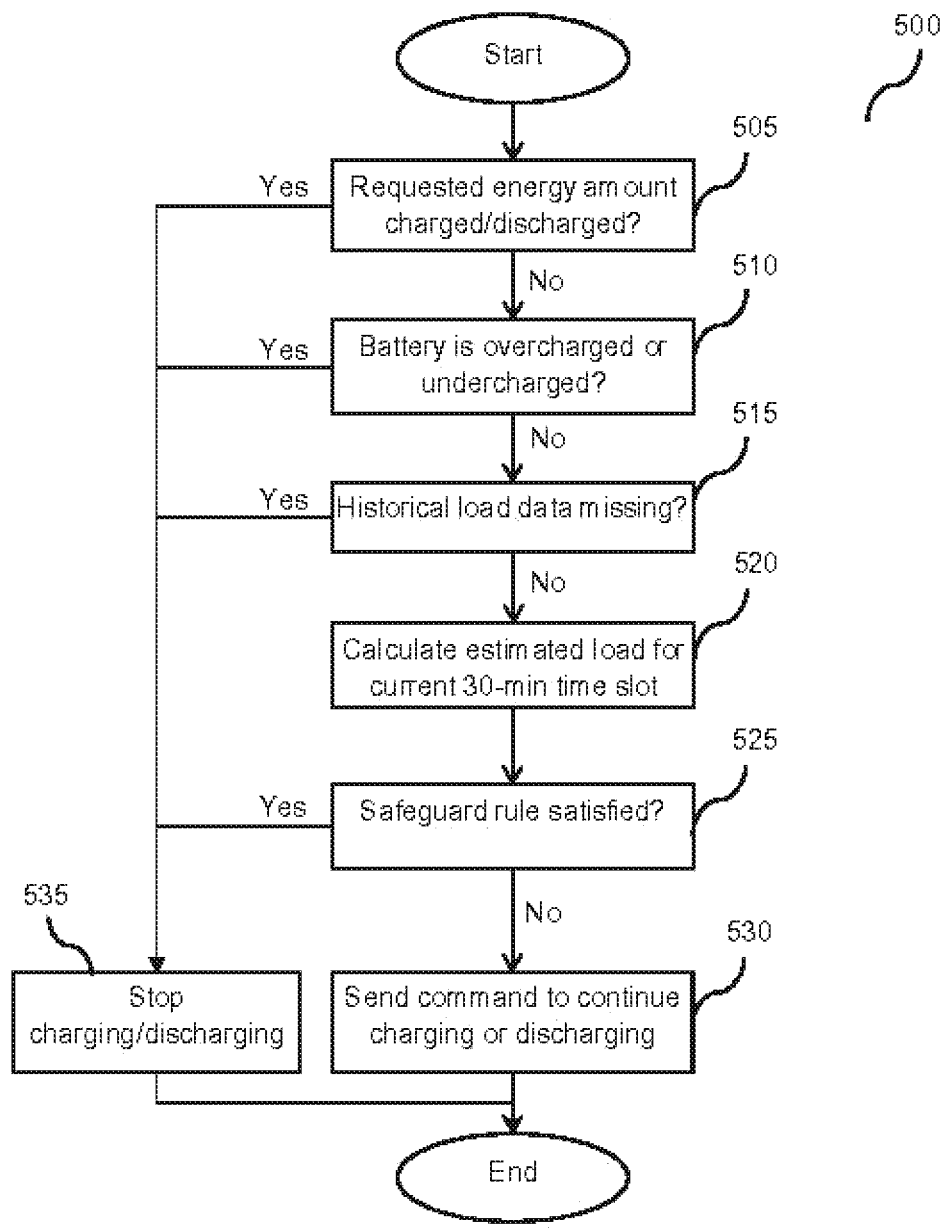
FIG. 5 illustrating a process flow on the Operation Service inside the Peak Shaving SPUG app in accordance with an embodiment of this invention.

FIG. 5 illustrates a process flow 500 on the Operation Service inside the Peak Shaving SPUG app which is responsible for con foiling the battery to charge or discharge a specified amount of energy in a 30-minute time slot. Process 500 is triggered at the beginning of the 30-minute time slot by the Scheduler which passes the amount of energy to charge or discharge in that particular 30-minute time slot.

When running, the Operation Service executes process 500 every 10 seconds in the following manner.

Process 500 begins with step 505 to check whether the requested amount of energy has been charged or discharged in this 30-minute time slot. This is done by querying the battery for the current cumulative charged or discharged energy. If yes, process 500 sends a command to the battery to stop charging or discharging in step 535 and ends thereafter. If no, process 500 proceeds to step 510.

In step 510, process 500 checks whether the minimum/maximum state of charge (SOC) limit is reached. This is done by querying the battery for the current SOC. If yes, process 500 sends a command to the battery to stop charging or discharging in step 535 and ends thereafter. If no, process 500 proceeds to step 515.

In step 515. Process 500 checks whether any historical load data point for the current 30 minute time slot is missing. The historical load data is retrieved from the app internal database. If yes, the Operation Service is unable to proceed to the next step confidently and hence, process 500 sends a command to the battery to stop charging or discharging in step 535. If no, process 500 proceeds to step 520.

In step 520, process 500 calculates the estimated load for the current 30-minute time slot by extrapolating the historical load data points. The historical load data is retrieved from the app internal database. Thereafter, process 500 evaluates the Battery Safeguard Rule as described above is satisfied in step 525 using the following information: estimated load calculated in step 520; requested amount of energy to charge or discharge; and current month's observed peak energy consumption retrieved from the app internal database. If yes, process 500 sends a command to the battery to stop charging or discharging ends thereafter. If no, process 500 proceeds to step 530.

In step 530, process 500 sends a command to the battery to continue charging or discharging. In step 535, process 500 sends a command to the battery to stop charging or discharging. Process 500 ends after step 530 or step 535.

Figure 6:
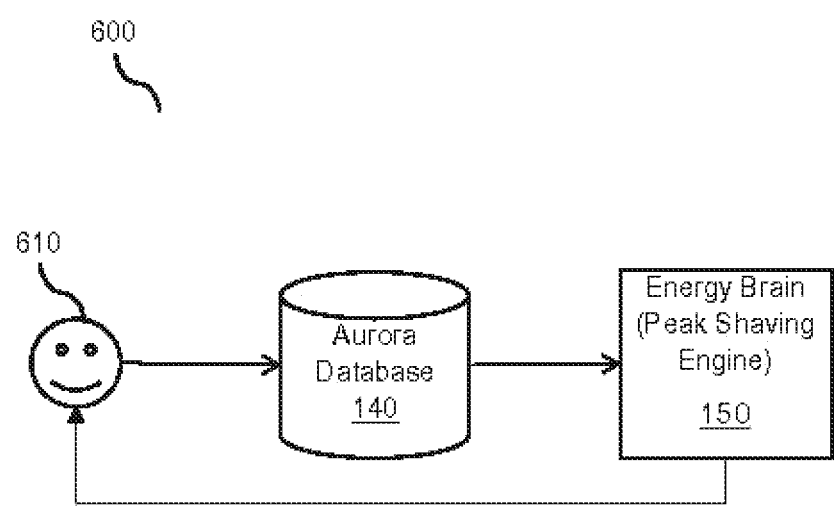
FIG. 6 illustrating a data flow 600 of a typical use case in accordance of this invention.

FIG. 6 illustrates a data flow 600 of a typical use case in accordance of this invention. Data flow 600 begins with clients 610 passing relevant information (e.g. battery initial capacity, signed contacted capacity (CC) value, battery operating constraints) to the Aurora database 140 via the Aurora Dashboard 142. The Aurora database 140 retrieves past 185 days of load data from a time series database and sends the data to the Energy Brain 150. In the Energy Brain 150, the Load forecasting module 210 uses the 185 days of load data to train a forecasting model. Load forecasting module 210 then saves the trained model to Model Repo. As mentioned above, the forecasting model is retrained on a monthly basis or at other predetermined intervals.

Thereafter, the Energy Brain 150 will call the mechanism 200 to forecast the next 24 hour load using past 8 days of historical data. The battery optimization module 230 will then send the command (optimised battery setpoint actions) that is derived based on the forecasting results to the clients.

This invention is packaged as a plug-and-play Software as a service (SaaS), which is well suited to be used in modern architecture, and fully automated and readily deployable using different management approaches with minimum efforts from customers. The invention could be sold to consumers who are facing growth in electrical demand but are not able to change contracted capacity scheme signed with the electricity supplier in a timely manner. It could also be sold to energy storage system (ESS) vendors as a new AI feature integrated into their systems. For countries which have significant peak/off-peak electricity price difference or have plenty of renewable energy (e.g. solar, geothermal and wind) to charge the ESS, this invention is most beneficial and is able to generate most cost savings.

The method in accordance with this invention is driven by computing system such as server, desktop, laptop or similar devices. A typical computing system comprises a processor, memory and instructions stored on the memory and executable by the processor. The processor may be a processor, microprocessor, microcontroller, application specific integrated circuit, digital signal processor (DSP), programmable logic circuit, or other data processing device that executes instructions to perform the processes in accordance with the present invention. The processor has the capability to execute various applications that are stored in the memory. The memory may include read-only memory (ROM), random-access memory (RAM), electrically erasable programmable ROM (EEPROM), flash cards, or any storage medium. Instructions are computing codes, software applications such as the Peak Shaving SPUG app that are stored on the memory and executable by the processor to perform the processes in accordance wifi this invention. Such computing system is well known in the art and hence only briefly described herein.

The above is a description of exemplary embodiments of a system and method in accordance with this disclosure. It is foreseeable that those skilled in the art can and will design alternative system and method based on this disclosure.

The invention claimed is:

1. A method for optimizing usage of electricity from a grid and energy storage comprising:

forecasting a predetermined number of hours of load at a predetermined interval to determine a forecasted load profile;

subtracting a peak load from the forecasted load profile by a maximum amount of electricity that can be charged into or discharged from the energy storage to determine a subtracted peak;

smoothening peaks within a 30-minute period that are more than the subtracted peak to flatten out a consumption profile around a forecasted peak so that a flattened period covers the peak load to obtain a final forecast result;

determining optimized battery setpoint actions based on the final forecast result and energy storage operating constraints comprising:

applying the energy storage operating constraints; and
minimizing an objective function that can be expressed in the following expression:

$$\text{Objective} = \sum_{t \in T} (P_{grid,t} \times \mu_t + P_{bat,t} \times \lambda) + 2 \times P^{peak}_{grid,t \in T} \times ucc$$

where $t \in T$ refers to a set of time steps in optimization horizon, $P_{grid,t}$ refers to electricity drawn from the power grid at time step t, kWh, $P_{bat,t}$ refers to electricity charged into/discharged from battery at time step t, kWh, $P_{grid,t \in t}^{peak}$ refers to peak electricity drawn from the power grid during optimization horizon, kWh, $\mu_t$ refers to electricity price at time step t, Currency unit/kWh, $\lambda$ refers to battery lifespan coefficient, Currency unit/kWh, wherein the steps of forecasting, subtracting, smoothening and determining are performed using at least one processor; and executing, by an energy management system, the optimized battery setpoint actions to control usage of the grid and energy storage.

2. The method according to claim 1 wherein the objective function is minimized by optimizing $P_{grid,t}$ and $P_{bat,t}$.

3. The method according to claim 1 wherein the step of applying the energy storage operating constraints comprises:

determine time period and amount the energy storage needs to be charged or discharged based on the energy storage operating constraints wherein the energy storage operating constraints include upper and lower bound of battery capacity and upper and lower bound of charge and discharge amount within every 30 minutes.

4. The method according to claim 1 wherein the setpoint actions comprises an amount of energy to be charged or discharged by the energy storage in the next 48 time slots of 30 minutes.

5. The method according to claim 4 further comprising:

controlling the energy storage to charge or discharge a specified amount of energy in a 30-minute time window based on the setpoint actions.

6. The method according to claim 5 wherein the step of controlling the energy storage to charge or discharge the specified amount of energy in a 30-minute time slot based on the setpoint actions comprises:

summing of an estimated consumption for the 30-minute window and the specified amount of energy to charge for the 30-minute window; and in response to the summation exceeding a current month observed peak consumption, stopping the energy storage from continuing to charge.

7. The method according to claim 1 wherein the step of forecasting a predetermined number of hours of load at the predetermined interval to determine the forecasted load profile comprises:
applying a multilinear regression model to run in sequence at 30-minute interval to generate a 30-minute load forecasting for the next 24 hours.

8. The method according to claim 7 wherein every run of the multilinear regression model includes a raw 30-minute consumption data over past 8 days and the 30-minute load forecasting for the next 24 hours.

9. A system for optimizing usage of electricity from a grid and energy storage comprising:
one or more computing processors executing instructions, wherein the instructions are configured to:
forecast a predetermined number of hours of load at a predetermined interval to determine a forecasted load profile;
subtract a peak load from the forecasted load profile by a maximum amount of electricity that can be charged into or discharged from the energy storage to determine a subtracted peak;
smooth peaks within a 30-minute period that are more than the subtracted peak to flatten out a consumption profile around a forecasted peak so that the flattened period covers the peak load to obtain a final forecast result; and
determine optimized battery setpoint actions based on the final forecast result and energy storage operating constraints, while determining the optimized battery setpoint actions, the instructions are further configured to:
apply the energy storage operating constraints; and
minimize an objective function that can be expressed in the following expression:

$$\text{Objective} = \sum_{t \in T}(P_{grid,t} \times \mu_t + P_{bat,t} \times \lambda) + 2 \times P_{grid,t \in T}^{peak} \times ucc$$

where
$t \in T$ refers to a set of time steps in optimization horizon, $P_{grid,t}$ refers to electricity drawn from the power grid at time step t, kWh, $P_{bat,t}$ refers to electricity charged into/discharged from battery at time step t, kWh, $P_{grid,t \in t}^{peak}$ refers to peak electricity drawn from the power grid during optimization horizon, kWh, $\mu_t$ refers to electricity price at time step t, Currency unit/kWh, $\lambda$ refers to battery lifespan coefficient, Currency unit/kWh; and
an energy management system receiving the optimized battery setpoint actions, and executing the optimized battery setpoint actions to control usage of the grid and energy storage.

10. The system according to claim 9 wherein while optimizing the battery setpoint, the instructions are configured to minimize the objective function by optimizing $P_{grid,t}$ and $P_{bat,t}$.

11. The system according to claim 10 wherein while optimizing the battery setpoints, the instructions are further configured to:
determine time period and amount the energy storage needs to be charged or discharged based on the energy storage operating constraints wherein the energy storage operating constraints include upper and lower bound of battery capacity and upper and lower bound of charge and discharge amount within every 30 minutes.

12. The system according to claim 11 wherein the setpoint actions comprises an amount of energy to be charged or discharged by the energy storage in the next 48 time slots of 30 minutes.

13. The system according to claim 12, wherein the instructions are further configured to:
control the energy storage to charge or discharge a specified amount of energy in a 30-minute time window based on the setpoint actions.

14. The system according to claim 13 wherein while controlling the energy storage to charge or discharge, the instructions are further configured to:
sum up an estimated consumption for the 30-minute window and the specified amount of energy to charge for the 30-minute window; and
in response to the sum exceeding a current month observed peak consumption, stop the energy storage from continuing to charge.

15. The system according to claim 9 wherein while controlling the energy storage, the instructions are configured to:
apply a multilinear regression model to run in sequence at 30-minute interval to generate a 30-minute load forecasting for the next 24 hours.

16. The system according to claim 15 wherein every run of the multilinear regression model includes a raw 30-minute consumption data over past 8 days and the 30-minute load forecasting for the next 24 hours.

* * * * *